United States Patent
McQuillan et al.

(10) Patent No.: US 9,660,994 B2
(45) Date of Patent: May 23, 2017

(54) SCADA INTRUSION DETECTION SYSTEMS

(71) Applicant: SCHNEIDER ELECTRIC USA, INC., Palatine, IL (US)

(72) Inventors: Jayme Lee McQuillan, Murfreesboro, TN (US); Chad Andrew Lloyd, Old Hickory, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 54 days.

(21) Appl. No.: 14/501,672

(22) Filed: Sep. 30, 2014

(65) Prior Publication Data

US 2016/0094578 A1    Mar. 31, 2016

(51) Int. Cl.
*H04L 29/06* (2006.01)
*G05B 19/042* (2006.01)
(Continued)

(52) U.S. Cl.
CPC ........... *H04L 63/10* (2013.01); *H04L 63/102* (2013.01); *H04L 63/1416* (2013.01);
(Continued)

(58) Field of Classification Search
None
See application file for complete search history.

(56) References Cited

U.S. PATENT DOCUMENTS

| 2009/0019531 A1 | 1/2009 | Rosenberger |
| 2012/0304130 A1* | 11/2012 | Rueff .................... H04L 43/026 715/850 |

(Continued)

FOREIGN PATENT DOCUMENTS

| WO | 2014042636 A1 | 3/2014 |
| WO | WO 2014042636 A1 * | 3/2014 ......... H04L 63/1416 |

OTHER PUBLICATIONS

Zhu et al., "SCADA-specific Intrusion Detection/Prevention Systems: A Survey and Taxonomy", Conference in Stockholm, Sweden, Apr. 12, 2010; pp. 16.

(Continued)

*Primary Examiner* — Hadi Armouche
*Assistant Examiner* — Andrew Steinle
(74) *Attorney, Agent, or Firm* — Lando & Anastasi, LLP (57) ABSTRACT

According to one aspect, a SCADA system is provided. The SCADA system includes a network interface configured to communicate data with a plurality of industrial control devices via an industrial control system (ICS) network. The SCADA system further includes a memory storing SCADA configuration information including ICS network configuration information and device information descriptive of each industrial control device of the plurality of industrial control devices and at least one processor in data communication with the memory and the network interface. The SCADA system also includes an intrusion detection component executable by the at least one processor and configured to read the SCADA configuration information, generate, from the SCADA configuration information, authorized communication information descriptive of one or more expected communication types of communications authorized for transmission via the ICS network.

17 Claims, 7 Drawing Sheets

(51) Int. Cl.
*H04L 12/24* (2006.01)
*G05B 19/418* (2006.01)

(52) U.S. Cl.
CPC ...... *H04L 63/1425* (2013.01); *H04L 63/1433* (2013.01); *H04L 63/1466* (2013.01); *G05B 19/0428* (2013.01); *G05B 19/418* (2013.01); *H04L 41/0883* (2013.01); *H04L 63/101* (2013.01)

(56) References Cited

U.S. PATENT DOCUMENTS

| | | | | |
|---|---|---|---|---|
| 2013/0074186 A1* | 3/2013 | Muttik | ............ | G06F 21/51 726/24 |
| 2013/0227689 A1* | 8/2013 | Pietrowicz | ............ | G01R 1/20 726/23 |
| 2014/0283047 A1* | 9/2014 | Dixit | ............ | G06F 21/55 726/23 |
| 2015/0347768 A1* | 12/2015 | Martin | ............ | G06F 21/62 726/1 |

OTHER PUBLICATIONS

"Chapter 7: Establishing Secure Enclaves; Chapter 8: Exception, Anomaly, and Threat Detection; Chapter 9: Monitoring Enclaves ED—Eric D Knapp", Jan. 1, 2011 (Jan. 1, 2011), Industrial Network Security. Securing Critical Infrastructure Networks for Smart Grid, SCADA, and Other Indurstial Control Systems, Syngress, pp. 147-247, XP002687973, ISBN: 978-1-59749-645-2.

Extended European Search Report from corresponding European Application No. 15187752.9 dated May 31, 2016.

* cited by examiner

SCADA INTRUSION DETECTION SYSTEMS

BACKGROUND

Technical Field

The present disclosure relates generally to the field of supervisory control and data acquisition (SCADA) systems and, more particularly, to SCADA systems, in which an intrusion detection system (IDS) is used to detect authorized activity.

Background Discussion

A SCADA system refers to any hardware or software application that has the ability to control local and remote devices. A SCADA system typically includes or communicates with an Industrial Control System (ICS) network. The ICS network is typically isolated from corporate networks and the internet and is responsible for connecting field devices to SCADA servers. A common attack on SCADA systems involves sending unsolicited data to the SCADA system that is contrary to a physical state of the normal activities of the SCADA system. For instance, reporting to a SCADA system that a fluid level was low, while the fluid level was actually very high, could result in a pump running and overflowing a container. While this does not involve alteration any code of the SCADA system, the end result could be just as severe.

Traditional IDS implementations are very effective at detecting abnormal traffic on connected networks. An IDS is a device or software application that monitors a computing environment (e.g. network or system) for traffic that is unauthorized. IDSs conventionally include an internal storage of the environment's configuration to differentiate between authorized and unauthorized traffic. This internal storage may include a whitelist of applications, devices, or addresses that are authorized by the IDS for execution or to be accessed. When an IDS detects abnormal traffic, the IDS notifies other systems and users of a potential breach so that appropriate actions may be taken. IDSs are conventionally deployed on ICS networks to protect SCADA systems, networks, and connected devices. Traditional IDS designs generally use a dedicated appliance or a separate server to keep ICS configuration information up-to-date.

SUMMARY

A challenge with traditional IDS implementations is that the configuration of the IDS is complex, and it is challenging to keep current (e.g. when a device connected to the SCADA system or equipment of the SCADA system is changed, etc.). Aspects and examples of embodiments disclosed herein present apparatus and processes that present a SCADA system with an intrusion detection component to allow the automatic creation of a whitelist so the configuration of the intrusion detection component can stay up to date without a need for manually changing the configuration every time a change in the devices occurs. Thus, aspects and examples disclosed herein ease the administrative burden associated with manually updating an intrusion detection component when a change in a network is made, saves time, and provides for a more secure network that can stay up to date with intrusion attempts more quickly than previously done.

According to one aspect, a SCADA system is provided. The SCADA system includes a network interface configured to communicate data with a plurality of industrial control devices via an industrial control system (ICS) network. The SCADA system further includes a memory storing SCADA configuration information including ICS network configuration information and device information descriptive of each industrial control device of the plurality of industrial control devices and at least one processor in data communication with the memory and the network interface. The SCADA system also includes an intrusion detection component executable by the at least one processor and configured to read the SCADA configuration information, generate, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices, identify, with reference to the authorized communication information, an unauthorized communication transmitted via the ICS network, the unauthorized communication having an unauthorized communication type different from any communication type of the one or more expected communication types, the unauthorized communication type being based on new device information descriptive of a device, and execute at least one action to address the at least one communication.

According to one embodiment, the new device information includes at least one of a new port number, a new address, a new protocol, and a new state. According to one embodiment, each expected communication type of the one or more communication types is based on the ICS network configuration information and the device information. According to one embodiment, the intrusion detection component is further configured to detect at least one change in the SCADA configuration information and regenerate, responsive to detection of the at least one change, the authorized communication information from the SCADA configuration information including the at least one change. According to one embodiment, the intrusion detection component is configured to regenerate the authorized communication information by modifying only a portion of the authorized communication information associated with the at least one change in the SCADA configuration information.

According to one embodiment, the intrusion detection component is configured to detect the at least one change at least in part by receiving a message from a SCADA configuration component including an indication of the at least one change. According to one embodiment, the at least one action includes at least one of transmitting a notification to a user interface, preventing further transmission of the unauthorized communication, and restricting subsequent communications involving the device. According to one embodiment, the notification includes a request for the user interface to respond with response data indicating allowance or denial of the unauthorized communication.

According to one embodiment, the response data indicates allowance of the unauthorized communication and the intrusion detection component is further configured to transmit, in response to the allowance, a configuration request to a SCADA configuration component included within the SCADA system, the configuration request including information identifying the device and instructing the SCADA configuration component to configure the SCADA configuration information to include the new device information, and regenerate, from the SCADA configuration information including the new device information, the authorized communication information to include the unauthorized communication type within the one or more expected communication types. According to one embodiment, the response data indicates denial of the unauthorized communication and the intrusion detection component is further configured to execute, in response to the denial, at least one action to prevent further transmission of the unauthorized communication and restrict subsequent communications involving the device.

According to one aspect, a computer-implemented method of managing an intrusion detection system (IDS) included within a supervisory control and data acquisition (SCADA) system in data communication with a plurality of industrial control devices via an industrial control system (ICS) network is provided. The method comprises reading, from a memory, SCADA configuration information including ICS network configuration information and device information descriptive of each industrial control device of the plurality of industrial control devices, generating, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices, monitoring the ICS network for communications, identifying, with reference to the authorized communication information, an unauthorized communication transmitted via the industrial control network, the unauthorized communication having an unauthorized communication type different from any communication type of the one or more expected communication types, the unauthorized communication type being based on new device information descriptive of a device, and executing at least one action to address the at least one communication.

According to one embodiment, identifying the unauthorized communication includes identifying an unauthorized communication having an unauthorized communication type based on at least one of a new port number, a new address, a new protocol, and a new state. According to one embodiment, the method further includes acts of detecting at least one change in the SCADA configuration information and regenerating, responsive to the at least one change, the authorized communication information from the SCADA configuration information including the at least one change. According to one embodiment, executing the at least one action includes executing at least one of transmitting a notification to a user interface, preventing further transmission of the unauthorized communication, and restricting subsequent communications involving the device.

According to one embodiment, transmitting the notification includes transmitting a notification including a request for the user interface to respond with response data indicating allowance or denial of the unauthorized communication. According to one embodiment, the response data indicates allowance of the unauthorized communication. According to one embodiment, the method further includes transmitting, in response to the allowance, a configuration request to a SCADA configuration component included within the SCADA system, the configuration request including information identifying the device and instructing the SCADA configuration component to configure the SCADA configuration information to include the new device information and regenerating, from the SCADA configuration information including the new device information, the authorized communication information to include the unauthorized communication type within the one or more expected communication types. According to one embodiment, the response data indicates denial of the unauthorized communication and the method further comprises executing, in response to the denial, at least one action to prevent further transmission of the unauthorized communication and restrict subsequent communications involving the device.

According to one aspect, a non-transitory computer readable medium with sequences of instruction for managing an intrusion detection system (IDS) included within a supervisory control and data acquisition (SCADA) system in data communication with a plurality of industrial control devices via an industrial control system (ICS) network stored on it is provided. The sequences of instructions include executable instructions that instruct the at least one processor to read, from a memory, SCADA configuration information including ICS network configuration information and device information descriptive of each industrial control device of the plurality of industrial control devices, generate, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices, monitor the ICS network for communications, identify, with reference to the authorized communication information, an unauthorized communication transmitted via the ICS network, the unauthorized communication having an unauthorized communication type different from any communication type of the one or more expected communication types, the unauthorized communication type being based on new device information descriptive of a device, and execute at least one action to address the at least one communication.

According to one embodiment, the new device information includes at least one of a new port number, a new address, a new protocol, and a new state. According to one embodiment, the computer-readable medium further includes instructions that instruct the at least one processor to detect at least one change in the SCADA configuration information and regenerate, responsive to the at least one change, the authorized communication information from the SCADA configuration information including the at least one change.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Embodiment disclosed herein manifest the realization that methods and systems are needed to address some of the shortcomings of conventional SCADA systems with regard to keeping an IDS up-to-date when a change in connected devices included in an ICS network occurs. In particular, there is a need for a way to easily detect a change in the devices and confirm that the new device is authorized to run in the SCADA system.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Various embodiments use information stored in the SCADA system that describes the state of devices included in the SCADA system to help mitigate IDS configuration challenges. Some of these embodiments also reduce the footprint of the IDS. In at least one embodiment, the IDS is a native component of the SCADA system, thereby removing the need for additional hardware dedicated to the IDS. In this embodiment, authorized communication information (e.g., a whitelist) is created from the SCADA system's stored configuration, which includes device information describing each of the connected devices and any information relating to the devices and the device communications. The whitelist may include all information necessary to define every authorized device in the ICS network, including interface points (e.g., the registers) each device uses and all of the permissions each device is given. The whitelist may only be manually accessed or edited by a user with a special role or permission given to the user by a "super" or "root" user that allows the user to access or edit the whitelist. This stored information may also be used to validate a change in the devices and adjust the whitelist. For example, when a device such as a breaker or power meter is removed from service for maintenance or repair and then replaced, the integrated SCADA IDS detects a device removal as the integrated SCADA IDS is aware of the state of the device and the device's communication settings. Once removed from the network, within seconds, the SCADA system reports a communication failure of the device. However, once a similar device with the same IP address is placed back in service, the SCADA IDS detects that the configuration of the device does not match recorded information (as the similar device is not the original device) and triggers an appropriate alarm. An alarm may be, for example, a misconfiguration alarm that may be raised if a device is configured in a manner inconsistent with the whitelist. The ICS network may be validated and stored in the SCADA system device data once the configuration for all devices is complete. Once validated, any change in the configuration of a device can trigger a validation requirement alarm to indicate that the ICS network needs to be re-validated. Further, if the IDS detects an unauthorized device due to the device having a configuration that is inconsistent with the whitelist, an unexpected device alarm may be raised.

In some embodiments, the whitelist includes information descriptive of all of the devices in the ICS network along with a number of identifiers of the devices, making it extremely difficult for an unauthorized component to emulate a device exactly. Further, since the SCADA system stores information descriptive of all the connected devices, the IDS can automatically reconfigure itself to adjust for the changed device. The IDS can then automatically merge those changes into the existing IDS configuration and continue monitoring.

Figure 1:
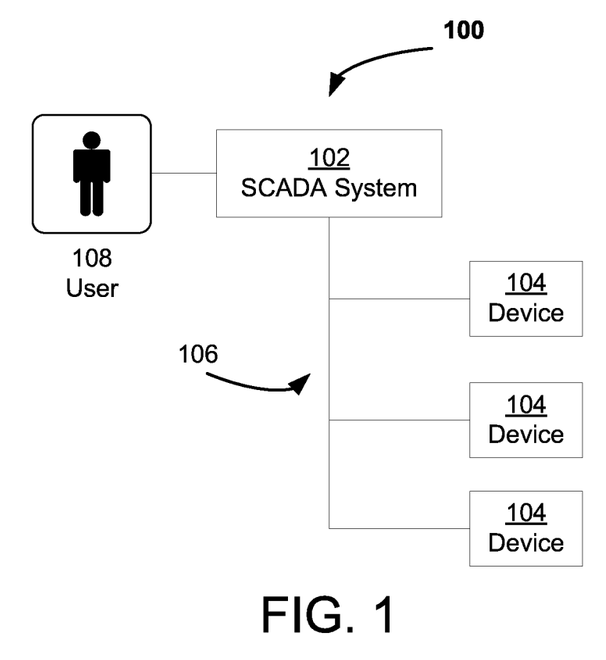
FIG. 1 is a block diagram of one example of an ICS network.

FIG. 1 illustrates different components within an example ICS network 100 including a SCADA system 102 constructed to receive configuration and state information from a plurality of devices 104 through a network 106. The state information may include whether a device is in an "active" state, a standby state, a "spare" state, an "unauthorized state" (indicating that the device may be a rogue device and should not be allowed access to the ICS network), and an "off" state. FIG. 1 also depicts a user 108 who interacts with the SCADA system 102.

In one example, the network 106 may include a complex of ICS networks comprised of standard Ethernet compatible components and common twisted-pair Cat-5 cabling or fiber. The network 106 may be an ICS network that is dedicated to the SCADA system 102 and isolated from corporate networks and the internet. In this example, the network 106 is responsible for connecting field devices 104 (e.g. power meters, breakers, etc.) to the SCADA system 102. In other examples, the network 106 is comprised of serial links or any other type of wired or wireless connections, including a combination of different types of connections. In other examples the network 106 may be an ICS network that is connected to the internet by means of an ICS-specific firewall. In this example, the IDS may concentrate on the internal portion of the network, allowing communication ingress and egress to proceed to the internet via the ICS-specific firewall. The SCADA system 102 is isolated except through that firewall. In other examples the SCADA System 102 may use a Unidirectional Gateway, also known as a data-diode, to allow the ICS network to provide data to the internet but allow no connections back in.

Figure 2:
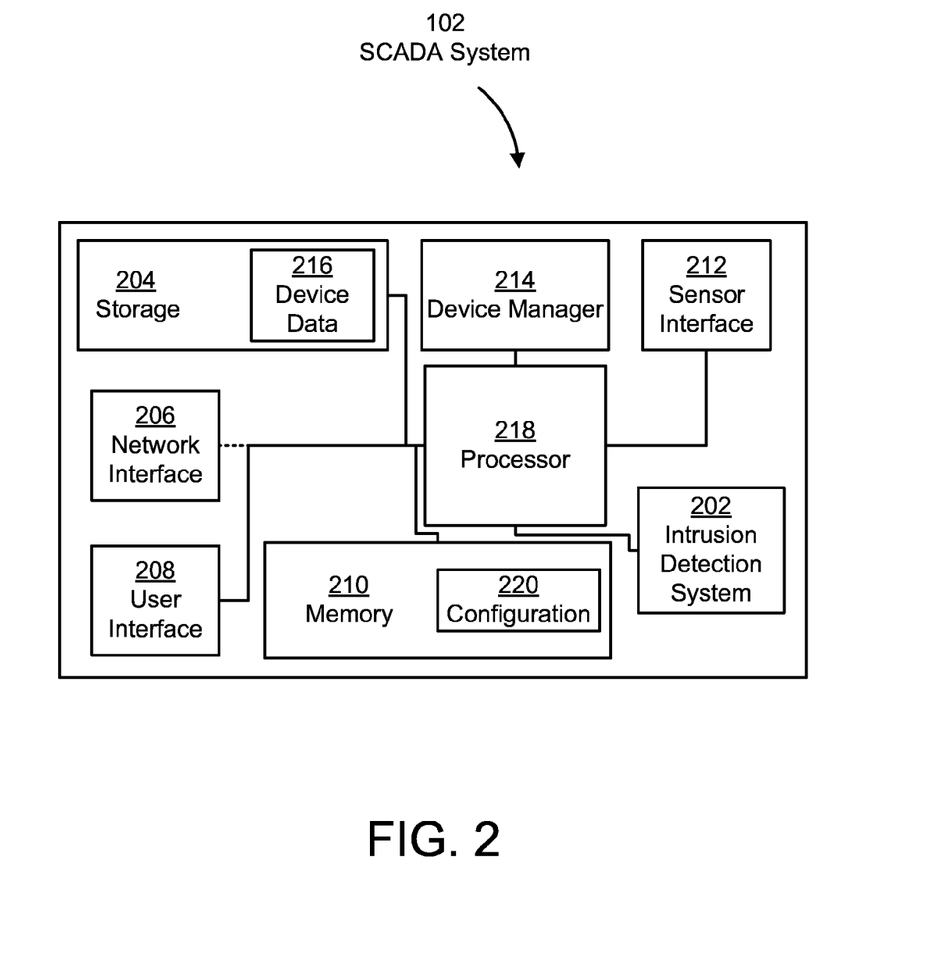
FIG. 2 is a block diagram of one example of a SCADA system.

FIG. 2 illustrates an example SCADA system 102 configured to monitor and control activities executed by the devices 104 via the network 106. The SCADA system 102 includes an IDS 202, a storage 204, a network interface 206, a user interface 208, a memory 210, a sensor interface 212, a device manager 214, and a processor 218. In various embodiment illustrated by FIG. 2, the processor 218 is coupled to and in data communication with the IDS 202, the storage 204, the network interface 206, the user interface 208, the memory 210, the sensor interface 212, and the device manager 214. The processor 218 may gather data and send commands to all of the parts of the SCADA system.

In some embodiments illustrated by FIG. 2, the memory 210 is configured to store configuration data 220 descriptive the ICS network 100. In some embodiments, the configuration data 220 describes the overall configuration of the ICS network 100. In these embodiments, the configuration data 220 is referenced by one or more components of the ICS network to enable interoperation of the devices 104 in execution of the operational objectives of the ICS network 100. For example, in at least one embodiment, the device manager 214 references the configuration data 220 to monitor and control of the individual devices 104 that comprise the ICS network 100. As such, the configuration data 220 must change when any of the devices 104 is removed or replaced.

In some embodiments, the storage 204 is configured to store the device data 216. This device data 216 may include information regarding each device included in the ICS network 100. For example, in some embodiments, the device data 216 is descriptive of the devices 104 that exchange information via the network 106. The device data 216 may include configuration information about each of the devices, such as device name, port number, IP address, MAC address, device ID, commands supported, read registers requested, write commands supported, write registers, protocols, states, and any other identifying characteristics. In some embodiments, the device data 216 further includes instructions (e.g. ladder logic) used to configure the devices 104 to execute operations. As described further below, this configuration information may be used by other system components, such as the IDS 102, to identify (e.g., uniquely identify or identify as a member of a group) each individual device connected to the network 106.

In various embodiments, the sensor interface 212 is configured to process telemetry data from sensors embedded within the devices 104 during operation of the ICS network 100. In some embodiments, the sensor interface 212 stores internal representations of this operational information in the storage 204. In other embodiments, the sensor interface 212 alternatively or additionally transmits the operational information to the user interface 208 or the device manager 214. In some embodiments, the sensor interface 212 also transmits commands to the devices 104. As is described further below, these commands may be communicated to sensors embedded within the device 104.

In various embodiments, the user interface 208 is configured to receive input from the user 108 and provide output to the user 108 that is descriptive of the devices 104 or the SCADA system 102. In some embodiments, when executing according to this configuration, the user interface 208 retrieves and stores internal representations of input and output regarding the device 104 within the device data 216. In other embodiments, the user interface 208 retrieves and stores internal representations of input and output regarding the SCADA system 102 within the device data 216. The user interface 208 may be constructed from a variety of hardware and software components. For instance, in one example, the user interface 208 includes a hardware button or switch that allows the user to manually switch devices. In other examples, the user interface 208 includes a web application implemented on a mobile device. Thus, according to the embodiments disclosed herein, the user interface 208 is not limited to a particular set of hardware or software components.

In various embodiments, the device manager 214 is configured to identify and configure the devices 104 using the device data 216. In some embodiments, when executing according to this configuration, the device manager 214 discovers new devices connected to the network 106 and stores data elements within the device data 216 descriptive of the new devices. In other embodiments, the device manager 214 exchanges messages with the devices 104 to update the devices 104 in response to receiving input from the user 108 via the user interface 208. The device manager 214 may transmit these configuration messages in response to input indicating selection of an immediate notification option presented by the user interface 208. Alternatively or additionally, the device manager 214 may transmit the configuration message at different, future points in time. Thus, according to one example, the user 108 may connect to the device manager 214 through the user interface 208 to switch a device to which the SCADA system 102 is connected, change the device's state to an active state, and optionally change another device's state to "spare" or "standby." A device in a spare state may be a device used as a manual replacement for a device that has failed or exhibits indications of imminent failure. A device in a standby state may be controlling or monitoring the same load or circuit as a device in active mode, and can automatically replace the standby device if failure occurs.

In various embodiments, the network interface 206 is configured to communicate with a plurality of remote devices and cloud computing sources. For example, when executing according to this configuration in some embodiments, the network interface 206 allows the SCADA system to connect with cloud computing sources to implement complex control algorithms that are practically infeasible to implement on a traditional programmable logic controller (e.g. a complex PID control algorithm). The network interface 206 may use a variety of protocols such as transport layer security or secure sockets layer to communicate with remote devices.

In various embodiments, the IDS 202 configured to monitor traffic on the network 106 and identifying any unauthorized activity (e.g., traffic, devices, etc.). When executing according to this configuration in some embodiments, the IDS 202 compares activity on the network 106 to a whitelist (e.g., the whitelist 404, which is described further below with reference to FIG. 4) to determine whether the activity is authorized. The IDS 202 may generate this whitelist using the device data 216. When generating the whitelist using the device data 216 (or when executing other actions), the IDS 202 may communicate with the storage 204 using standard security protocols. These standard security protocols may include packet-based and transport-based security protocols. Packet-based security protocols may encrypt a message before passing the message across a secure or insecure channel. Transport-based security mechanisms may encrypt either encrypted or unencrypted traffic inside of a "tunnel." The "tunnel" is a transport for data that implements encryption or other security. Transport-based security protocols include SSL and TLS. In some embodiments, the IDS 202 may comprise a dedicated processor and memory. In other embodiments, the IDS 202 may be implemented by the SCADA system's processor 218.

In some embodiments, the IDS 202 is configured to respond to unauthorized activity by executing one or more configurable actions. These actions may include transmitting a notification (e.g., an alarm) descriptive of the unauthorized activity to the user interface 208. These actions may also include transmitting a request to the device manager 214 to shut down devices that pose a potential security risk. In other embodiments, the configurable actions may include reducing permissions for an unauthorized device to prevent access to important areas of the SCADA system until a user can confirm whether or not the unauthorized device should be authorized.

Within the SCADA system 102, data may be stored in any logical construction capable of storing information on a computer readable medium including, among other structures, flat files, indexed files, search engine indexes, hierarchical databases, relational databases or object oriented databases. These data structures may be specifically configured to conserve storage space or increase data exchange performance. In addition, various examples organize the data into particularized and, in some cases, unique structures to perform the functions disclosed herein. In these examples, the data structures are sized and arranged to store values for particular types of data, such as integers, floating point numbers, character strings, arrays, linked lists, and the like.

Information may flow between the components illustrated in FIG. 2, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 3:
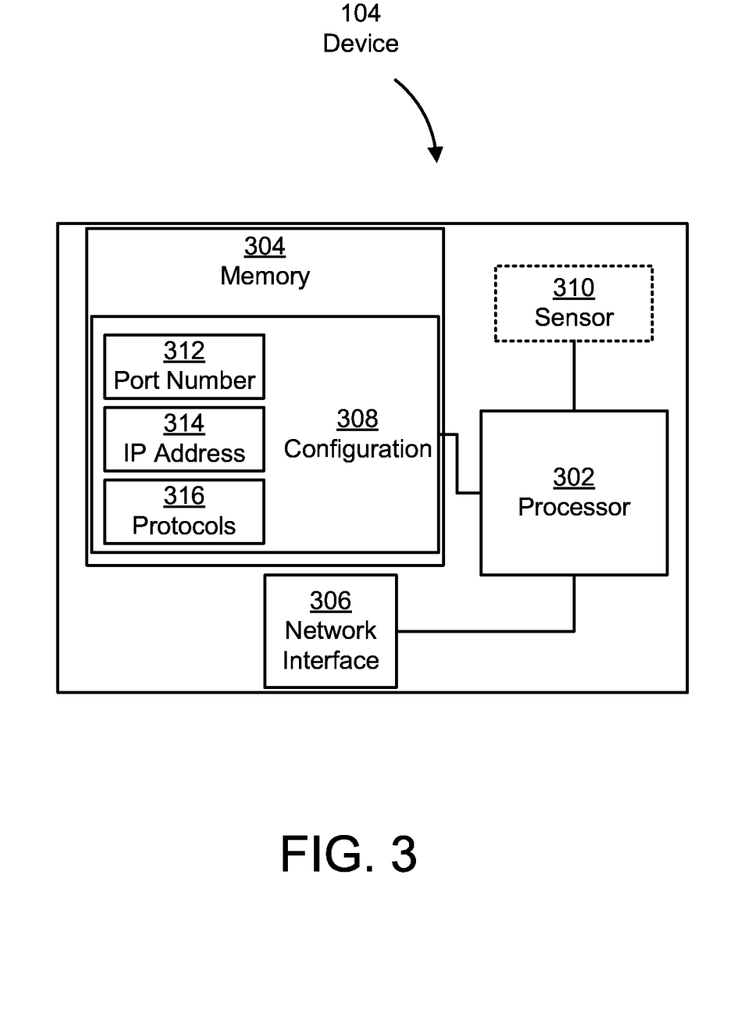
FIG. 3 is a block diagram of one example of a device included within an ICS network.

FIG. 3 illustrates a block diagram of a device 104. The device 104 may include an industrial control device, such as an intelligent electronic device (IED) or a programmable device. For example, the device 104 may be a programmable logic controller (PLC), power monitor such as a power meter, a transformer, a tie, a capacitor bank, a protection relay device such as a circuit breaker, a remote terminal unit (RTU), a transfer switch, a fault passage indicator, or any other type of industrial control device. As shown in FIG. 3, the device 104 includes a processor 302, a memory 304, a network interface 306, and a sensor 310. The memory 304 stores configuration data 308. The configuration data 308 includes information descriptive of a port number 312, an IP address 314, and protocols 316 supported by the device 104. The configuration data 308 also includes information descriptive of all of the specific registers, commands, messages, or other communications that can be processed by the device.

In some embodiments, the processor 302 is configured to execute device operations and to exchange a variety of information with the sensor interface 212 and the device manager 214 via the network interface 306. In these embodiments, the network interface 306 is coupled to and in data communication with a network, such as the network 106 described above with reference to FIG. 1. More specifically, in at least one embodiment, the processor 302 is configured to exchange telemetry information with the sensor interface 212, and configuration information, such as the configuration information 308, with the device manager 214. The configuration information 308 may include the port number 312, the IP address 314, protocols 316, and other information such as the state of the device.

In some embodiments, the sensor 310 includes one or more analog sensors, analog inputs, and digital outputs. In these embodiments, the sensor 310 includes an analog to digital converter that converts analog sensor signals to digital telemetry data. The sensor 310 may provide this telemetry data to the processor 302. In at least one embodiment, the sensor 310 also includes digital inputs through which the processor 302 transmits digital commands received from the sensor interface 212.

Figure 4:
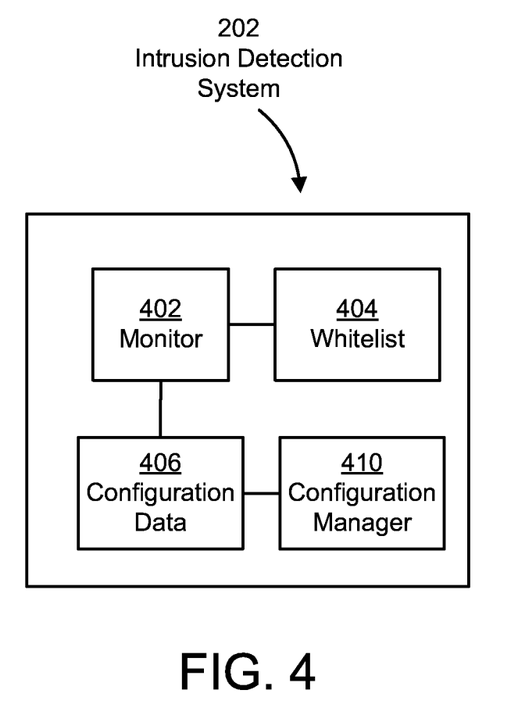
FIG. 4 is a block diagram of one example of an IDS.

FIG. 4 illustrates an example of a block diagram of an IDS 202 within a SCADA system 102. As shown in FIG. 4, the IDS 202 is configured to monitor traffic to determine whether a device or a device's activity may be unauthorized and, therefore, potentially harmful. The IDS 202 includes a monitor 402, a whitelist 404, configuration data 406, and a configuration manager 410.

In one embodiment, the monitor 402 is configured to analyze traffic within the ICS network 100. When executing according to this configuration, the monitor 402 may compare the state, port number, IP address, and protocols of a device (e.g., one of the devices 104 described above with reference to FIG. 1) to the state, port number, IP address, and protocols of entries in the whitelist 404 for the device. For example, if a source device transmits an information packet and in the whitelist the device is noted to be active, the IDS 202 may provide the incoming traffic to the monitor 402. The monitor 402 may compare the source device's port number, IP address, and protocols as indicated by the incoming traffic to the information in the whitelist 404 for the source device. If one of the characteristics of the source device indicated in by the traffic does not match the corresponding characteristic in the whitelist 404, the source device is not authorized, and the monitor 402 may transmit an alarm to a user interface, such as the user interface 208 described above with reference to FIG. 2. Further, the monitor 402 may send a message to the device manager 214 to restrict access for the source device. An example of some of the information that may be provided in the whitelist 404 for a power meter is shown in Table 1.

TABLE 1

Example Whitelist

| | |
|---|---|
| Device Name | "Power Meter Main" |
| MAC Address | AA:BB:CC:DD:EE:FF |
| IP Address | 192.168.2.56 |
| Port Number | 550 |
| Device State | Active |
| Modbus Device ID | 1 |
| Modbus Commands Supported | 1, 2, 4 |
| Modbus Read Registers Requested | 1101-1199, 1250 |
| Write Commands Supported | 5, 6, 15, 16 |
| Modbus Write Registers | 404, 405 |

In this example, traffic originating from or addressed to the power meter should identify the power meter using an IP address of 192.168.2.56, a MAC address of AA:BB:CC:DD:

EE:FF, and a port number of 550. In addition, only the registers of 1101-1199 and 1250 should be read and only the registers of 404 and 405 should be written to. Additionally, the only Modbus commands that should be included in the traffic are 1, 2, and 4 and the only write commands that should be included are 5, 6, 15, and 16. This way, the IDS can compare the incoming device traffic to the whitelist, which is built, in part, from stored device data 216. After comparing the incoming traffic to the whitelist, the IDS may authorize (e.g., where all of the information in the traffic is consistent with the whitelist) or block (e.g., where any element or elements of the information in the traffic is inconsistent with the whitelist) the device communication. The state may also used by the IDS.

The SCADA system device data 216 may store a "device profile" for each device. The "device profile" includes all of the information that the SCADA system may need to allow the IDS to detect rogue traffic, including the device name, the device's MAC address, the device's IP address, the device's port number, the device's ID, the commands the device supports, the read registers the device may request, the write commands the device may support, the write registers the device may use, and other device information for each device in the ICS network. In addition, the "device profile" may also include all of the controls and writes that could be executed from the SCADA system to the device and all other information that may be read from the device.

In some embodiments, the whitelist 404 may be generated using device data, such as the device data 216 held in the storage 204 of the SCADA system 102, the device data having been stored within the SCADA system 102 as a result of the SCADA system's 102 configuration. The whitelist 404 may include information about each of the devices such as a state (active, standby, spare, unauthorized, off), port number, IP address, protocols, and other identifying characteristics of the device. In some embodiments, the SCADA system 102 intrinsically stores information about the devices 104, so all of the information for the whitelist 404 may come directly from the device data 216 of the SCADA system 102. The whitelist 404 may be used to validate traffic generated by any of the devices. If any of the device data 216 associated with the traffic does not match corresponding entries in the whitelist 404, the unauthorized device or device activity may be addressed. If the unauthorized activity was the result of an authorized change to the ICS network 100, for example if a device was manually switched out, the user may validate the change and the whitelist 404 may be automatically updated with the updated device information by the IDS 202. Once the whitelist 404 has been updated, the monitor 402 allows traffic generated by the new device to continue unrestricted. In some embodiments, the configuration 406 specifies actions to be executed by the monitor 402 upon detection of an unauthorized activity. The user may edit the configuration data 406 from the user interface 208 to, for example, automatically block traffic generated by unauthorized devices, shut down unauthorized devices, or simply trigger an alarm to the user that an unauthorized device or activity has been detected. It may be appreciated that if a device attempts to communicate with a register that it should not be able to communicate with or a register that does not exist, the whitelist, as a result of being built off of the configuration information, will be able to detect that the device should not be able to communicate with the register and can take action to prevent communications from that device.

In some embodiments, the configuration data 406 also specifies which characteristics of a device should be used by the monitor 402 when comparing traffic from a device with the whitelist 404 to determine whether activity or the device is authorized or unauthorized. Thus, in these embodiments, device-specific whitelist entry types may be used to identify authorized or unauthorized activity. Moreover, the whitelist entry types may differ over time for a specific device. The configuration data 406 may also be automatically updated whenever a change is made to the ICS network 100. For example, the IDS 202 may be notified of, or independently determine via inspection of the device data 216, that a change has occurred in the SCADA component configuration, the device configuration, or the network layout. In this event, the user may validate this reconfiguration. In some examples, alarms for reconfiguration will be displayed to the user in real time or near real time. It is appreciated that automated IDS reconfiguration removes the need for a user to manually update the configuration every time something in the network changes. In some examples, the configuration manager 410 reads IDS configuration information from the configuration data 406, SCADA system configuration information and ICS network configuration information from the configuration data 220, and device configuration information from the device data 216 to compile data for the generation of the whitelist of information of the connected devices 104. In some embodiments, the configuration manager 410 automatically merges changes into the configuration data 406 and the whitelist 404. The whitelist 404 may be stored in a database or any other form of logical or physical data structure within the IDS 202. In some implementations the whitelist 404 may be in the memory 210 of the SCADA system. In some implementation the IDS configuration data 406 and the whitelist 404 may be too big to store in memory 210 and may be stored in a non-volatile storage device, such as the storage 204. In some examples the IDS 202 may be configured to change the SCADA component configuration, the device configuration, and the ICS network layout if the IDS detects an unauthorized change in a device. In other examples, if unauthorized traffic is detected, additional security measures can be raised. These security measures include requesting a password before any control operation or issuing an alarm or notification that indicates detected, abnormal activity to a user. The change may also be to rollback to a previous state or to reconfigure the SCADA component configuration, the device configuration, and the network layout to use a different device.

It is appreciated that since all of the data for the devices 104 connected to the SCADA system 102 are already in the SCADA system 102, the whitelist 404 that is created from that data is also intrinsic to the SCADA system 102. Having a central intrinsic data store including information descriptive of all of the devices 104 connected to the SCADA system 102 that are active, on standby, in spare mode, or off helps avoid the need for additional hardware or delay times in transferring the data. Previous methods of generating a whitelist may scan or learn parts of the SCADA system 102 from an external system, but using an internal storage 204 with the device data 216 makes getting information about all of the connected devices 104 simpler and more direct. Further, using an intrinsic whitelist enables greater accuracy regarding devices on standby, since the SCADA system 102 has stored information descriptive of the devices on standby, as opposed to external systems that create a whitelist by scanning connected devices and may miss devices that are not active at the time of scanning. Using an IDS or a whitelist that is not internal to the SCADA system makes it hard to discover or scan devices that are in standby or in a mode that is not active. Traditional IDS implementations do not have a data store descriptive of all the connected devices in an ICS network, so if a new device is added to the network, the user must manually add the new device to the SCADA configuration and, as a separate and distinct manual activity, add the new device the whitelist.

Example Computer System

Figure 5:
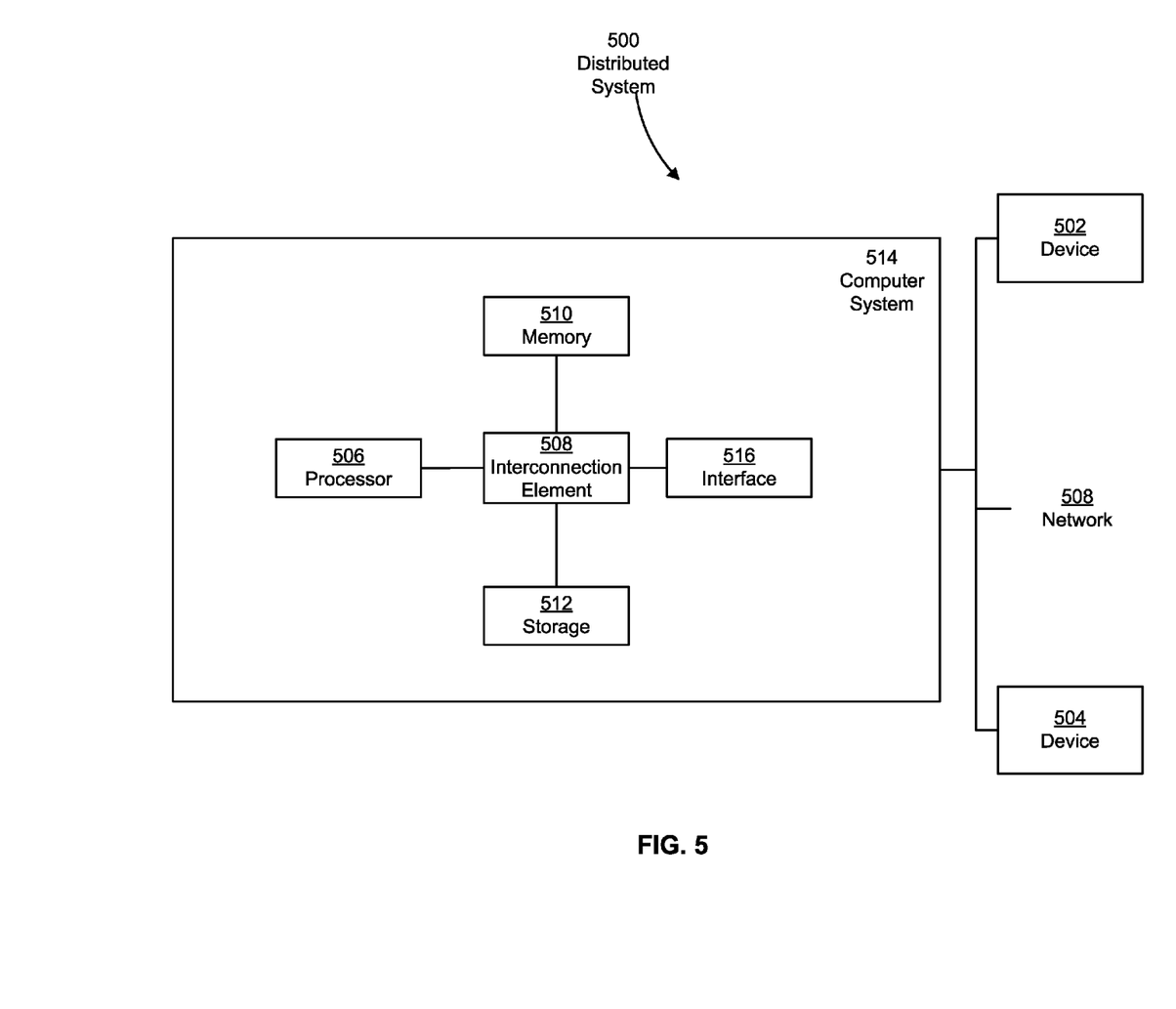
FIG. 5 is a block diagram of one example of a computer system.

FIG. 5 illustrates an example a block diagram of computing components forming a system 500 which may be configured to implement one or more aspects disclosed herein. For example, the system 500 may be communicatively coupled to a SCADA system or included within a SCADA system and configured to perform a monitoring or whitelisting process as described above. The system 500 may also be used to display information regarding the SCADA system, the IDS, and the devices to a user.

The distributed system 500 includes a computer system 514. The computer system 514 may include for example a general-purpose computing platform such as those based on Intel PENTIUM-type processor, Motorola PowerPC, Sun UltraSPARC, Texas Instruments-DSP, Hewlett-Packard PA-RISC processors, or any other type of processor. System 500 may include specially-programmed, special-purpose hardware, for example, an application-specific integrated circuit (ASIC). Various aspects of the present disclosure may be implemented as specialized software executing on the system 500 such as that shown in FIG. 5.

The system 500 may include a processor/ASIC 506 connected to one or more memory devices 510, such as a disk drive, memory, flash memory or other device for storing data. Memory 510 may be used for storing programs and data during operation of the system 500. Components of the computer system 500 may be coupled by an interconnection mechanism 508, which may include one or more buses (e.g., between components that are integrated within a same machine) or a network (e.g., between components that reside on separate machines). The interconnection mechanism 508 enables communications (e.g., data, instructions) to be exchanged between components of the system 500. Further, in some embodiments the interconnection mechanism 508 may be disconnected during servicing of a PDU.

The system 500 also includes one or more input devices 504, which may include for example, a keyboard or a touch screen. An input device may be used for example to configure the measurement system or to provide input parameters. The system 500 includes one or more output devices 502, which may include for example a display. In addition, the computer system 500 may contain one or more interfaces 516 that may connect the computer system 500 to a communication network, in addition or as an alternative to the interconnection mechanism 508.

The system 500 may include a storage system 512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor 506 may cause data to be read from the nonvolatile medium into another memory 510 that allows for faster access to the information by the processor/ASIC 506 than does the medium. This memory 510 may be a volatile, random access memory such as a dynamic random access memory (DRAM) or static memory (SRAM). It may be located in storage system 512 or in memory system 510. The processor 506 may manipulate the data within the integrated circuit memory 510 and then copy the data to the storage 512 after processing is completed. A variety of mechanisms are known for managing data movement between storage 512 and the integrated circuit memory element 510, and the disclosure is not limited thereto. The disclosure is not limited to a particular memory system 510 or a storage system 512.

The system 500 may include a general-purpose computer platform that is programmable using a high-level computer programming language. The distributed system 500 may be also implemented using specially programmed, special purpose hardware, e.g. an ASIC. The system 500 may include a processor 506, which may be a commercially available processor such as the well-known Pentium class processor available from the INTEL CORPORATION. Many other processors are available. The processor 506 may execute an operating system which may be, for example, a WINDOWS operating system available from the MICROSOFT CORPORATION, MAC OS System X available from APPLE COMPUTER, the SOLARIS Operating System available from SUN MICROSYSTEMS, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Device Detection Processes

As discussed above with reference to FIGS. 1-5, in some embodiments a whitelist is automatically created to list all of the allowed devices that may communicate with an ICS network, such as the ICS network 100 described above with reference to FIG. 1. More specifically, according to one embodiment, an IDS in a SCADA system generates a whitelist by using the SCADA system's inherent storage of all of the devices to which the SCADA system is connected.

Figure 6:
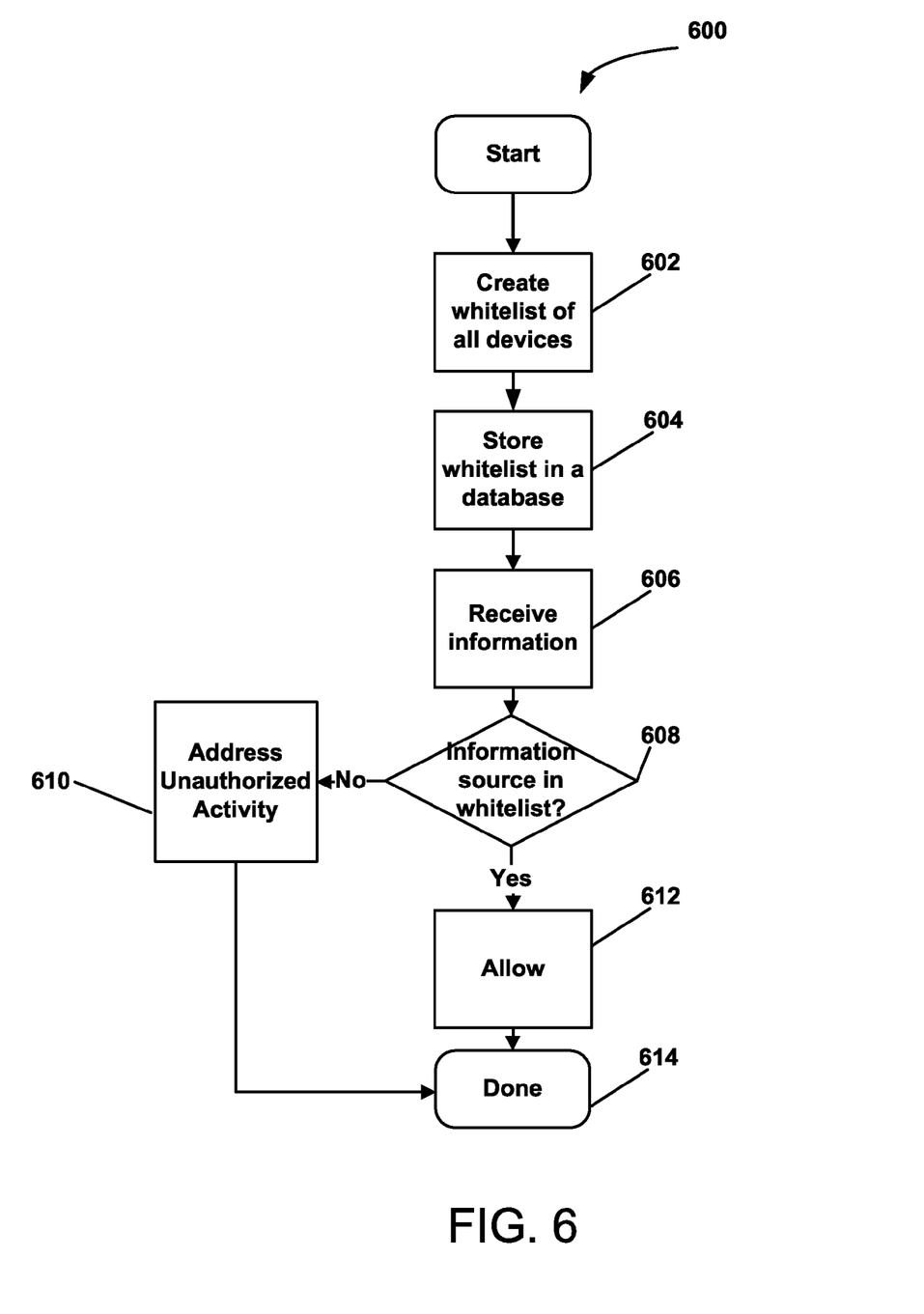
FIG. 6 is a flow diagram of one example of SCADA whitelisting process.

FIG. 6 is a flowchart that illustrates a whitelisting process 600. The whitelisting process 600 may be executed to create or recreate a whitelist and to check ICS network traffic to determine if information from a specific devices in the ICS network is authorized or unauthorized. In act 602, a whitelist, such as the whitelist 404 described above with reference to FIG. 1, is created or recreated using the device data in the SCADA system. In some embodiments, the device data is taken from the SCADA system's configuration information. In some embodiments, the whitelist is descriptive of a variety of communication types describing or transmitted by the connected devices, any communication protocols they support, and information about the devices such as their state, address (IP address, MAC address, etc.), and port number. In some embodiments, the whitelist may be automatically edited or updated to account for a change in the system, instead of being completely rewritten every time a change is made. If a user changes a device or wants to add a device to the SCADA system, the device may be authorized, detected, and added to the whitelist by either deleting and recreating the whole whitelist or updating the whitelist. For example, a user may update the SCADA system configuration, a device configuration, the IDS configuration, or the network layout through the user interface. In some examples the change may be a result of an automatic replacement of a failing device. In these examples a device that fails may be replaced by a standby device.

In act 604, the whitelist is stored in a database. The whitelist may include previous edits with timestamps to show the user when a change was made. The whitelist may also include any information about a device that may be relevant to identifying the device. In some embodiments the database is used to store versions of the whitelist over time. It is appreciated that using a database allows for simpler reversions to previous whitelists where appropriate.

In act 606, the SCADA system receives information from a device. In some embodiments, the IDS monitors all data communications in the ICS network, and may be configured to respond to different communications in different ways, depending on if the communications are authorized or not. The received information may be generated by normal ICS network operations and may include a request for access to a part of the system or a notice to change a parameter of the system. The information may be solicited or unsolicited. The information may also be requested by the SCADA system, and if an unauthorized device sends data back then the IDS can use the whitelist to address the unauthorized activity. Even though the SCADA system sent a request and expected a response, the IDS that monitors the ICS network can detect that the received data is not from the expected source and can address the communication appropriately.

In act 608 the IDS checks the communication information received against the whitelist of devices. If the sender device is on the whitelist, then the sender is an authorized device and the communication may be allowed to go through, as shown at act 612. If the sender device is not on the whitelist, then the device is not authorized to communicate on the ICS network and the IDS addresses the unauthorized communication by executing the act 610.

In the act 610, the IDS addresses the unauthorized communication. The unauthorized device may be a device that a user manually replaced or a rogue device. In either case, the SCADA system triggers an alarm to alert the user via the user interface of the problem and responds with one or more actions. For example, until the user responds with whether or not the device should be authorized, communications transmitted by the device may terminated by the IDS or ignored by all devices at the instruction of the IDS. The actions may also include shutting down the device (if possible) and rolling back the system to a state before the device made any changes (if the device made any changes). If the user confirms that the device is unauthorized, the SCADA system rejects any and all communications with the device. However, if the user indicates, via the user interface, that the device should be added, the SCADA system authorizes the device by changing the SCADA system configuration, the IDS configuration, and by automatically regenerating, either fully or in part, the whitelist to include the previously unauthorized communication type and device information.

The whitelisting process 600 ends at 614.

More particularized examples of an IDS executing acts 606-610 will now be described. In one example, a source device, such as any of the device 104 described above with reference to FIG. 1, transmits a message to the SCADA system that includes an indication that a fluid level is low. In executing the acts 606 and 608, an IDS included with the SCADA system intercepts the message and analyzes it to determine whether it meets any applicable whitelist entries. If so, the IDS executes the act 612 and releases the message to the SCADA system for subsequent processing. This subsequent processing includes receiving the message and causing a pump to run to refill a container. However, if the message does not meet one or more of the whitelist entries, the message is unauthorized. For instance the message may have been originated by an unauthorized device which reports a low fluid level while the fluid level is actually normal. In this instance, the IDS executes the act 610, detects the unauthorized message, and prevents the message from being acted upon by the SCADA system, thus avoiding an overflowing of the container. In this example of the act 610, the IDS detects the unauthorized message by comparing the states of all of the devices and their communication settings to entries in the whitelist and determining that some of the states and setting do not match their corresponding whitelist entries.

According to another embodiment, the whitelist may be automatically updated by the IDS whenever a change is detected, such as a change in a SCADA component configuration, a device configuration, or a network layout of the ICS network.

Figure 7:
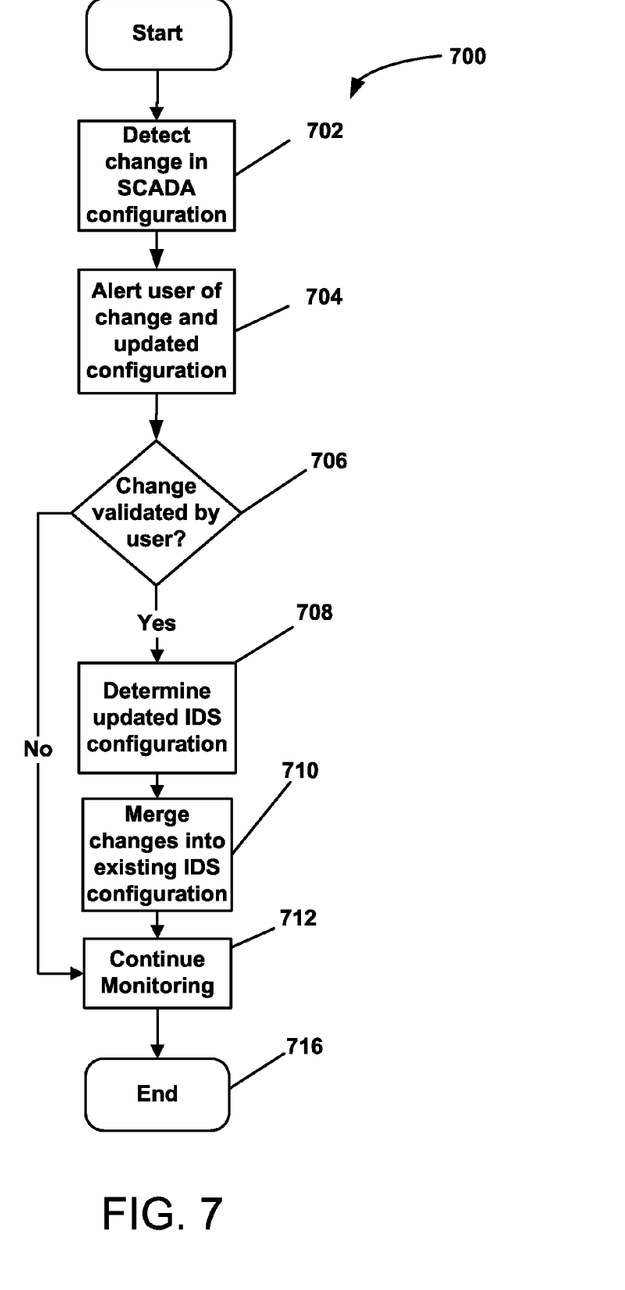
FIG. 7 is a flow diagram of one example of a process for updating a whitelist.

FIG. 7 is a flowchart that illustrates an updating process 700. The updating process 700 may be executed to detect and react to a configuration change. For example, if a user replaced a component within the ICS network or if a component failed and stopped responding, the SCADA configuration, device configuration, or the network layout may be updated. In response to this update, the IDS may modify its configuration and whitelist by executing the updating process 700.

In act 702, a change in the configuration of at least one of the SCADA system configuration, the device configuration, and the network layout is detected. The change may be a result of a manual change due to a component being upgraded, replaced, or improperly configured. The IDS may detect the change as a result of an unexpected device sending data.

In act 704, the user is alerted of the change in the configuration. The alert may be through an alarm, an email to the user, a notification on a computer, a notification on a mobile device, a light turning on, a sound playing, or any other way to alert a user. In some examples the user is not notified about the change in the SCADA configuration, the device configuration, or the network layout. In those examples, the IDS configuration may be set to automatically assume the change is valid or invalid and skip to step 708 or 714 respectively. In other examples, the IDS may detect if the device at least matches a different device on the whitelist and if the device is a device that should have been on standby, the IDS may assume the expected device was replaced and continue to 714. If the device does not match any of the devices on the whitelist, in those examples, the IDS identifies the device as being unauthorized and restricts the unauthorized device's access, triggers an alarm, or shuts the device down. It is appreciated that where a previously used device has been refurbished, placed back into commission, and begins to send traffic, the device may appear as unauthorized and trigger an alarm (e.g., where the SCADA configuration has not been updated to reflect the recommissioning of the refurbished device).

In act 706, the user validates the change. The user may validate the change via a computer or via other hardware such as by a physical button click. If the user validates the change, then the IDS determines an updated configuration as well as an updated whitelist, as shown in 708. In some examples, the IDS automatically retrieves information from the SCADA device data to update its configuration and whitelist. The configuration information for the devices, the network layout, and the SCADA configuration may all be retrieved to be put into the IDS configuration. Using the updated device information from the SCADA configuration information, the IDS may create an updated whitelist. In some examples, the IDS configuration is completely remade and replaces the old IDS configuration. In other examples the IDS configuration may be edited to make up for the changes in the SCADA system, the devices, and the network layout.

After the updated IDS configuration is determined, in act 710, the IDS automatically merges the updated IDS configuration into the existing IDS configuration. In some examples, the merge may be done by the SCADA system's processor. The whitelist is also updated. The old whitelist may be deleted and reconstructed or the updated information may be used to update the whitelist by changing it. After the IDS configuration and whitelist have been automatically updated, the IDS continues to monitor the devices using the updated configuration and whitelist.

In act 714, the user has noted that the change is unexpected and the IDS will determine that the new device must be an unauthorized device. Therefore, no changes are made to the IDS configuration, and the IDS continues to monitor the devices, as shown in act 716. If the device that is expected to send data is offline, the SCADA system may inform the user that the device needs to be replaced. In some examples the SCADA system may replace the device on its own if a known replacement in standby mode exists in the whitelist. In other examples the IDS may flag the potential threat and shut down or limit access to the unauthorized device.

Processes 600 and 700 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely an expense report system configured according to the examples and embodiments disclosed herein.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A supervisory control and data acquisition (SCADA) system comprising:
   a network interface configured to communicate data with a plurality of industrial control devices via an industrial control system (ICS) network;
   memory storing SCADA configuration information including ICS network configuration information and device information descriptive of each industrial control device of the plurality of industrial control devices;
   at least one processor in data communication with the memory and the network interface; and
   an intrusion detection component executable by the at least one processor and configured to:
      read the SCADA configuration information;
      generate, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices and including one or more valid write commands and state information associated with an industrial control device of the plurality of industrial control devices;
      monitor the ICS network for communications;
      detect at least one change in the SCADA configuration information;
      regenerate, responsive to detection of the at least one change, the authorized communication information from the SCADA configuration information;
      identify, with reference to the authorized communication information, an unauthorized communication transmitted via the ICS network, the unauthorized communication having an unauthorized communication type different from any communication type of the one or more expected communication types, the unauthorized communication type being based on new device information descriptive of a device; and
      execute at least one action to address the at least one communication.

2. The SCADA system of claim 1, wherein the new device information includes at least one of a new port number, a new address, a new protocol, and a new state.

3. The SCADA system of claim 1, wherein each expected communication type of the one or more communication types is based on the ICS network configuration information and the device information.

4. The SCADA system of claim 1, wherein the intrusion detection component is configured to regenerate the authorized communication information by modifying only a portion of the authorized communication information associated with the at least one change in the SCADA configuration information.

5. The SCADA system of claim 1, wherein the intrusion detection component is configured to detect the at least one change at least in part by receiving a message from a SCADA configuration component including an indication of the at least one change.

6. The SCADA system of claim 1, wherein the at least one action includes at least one of transmitting a notification to a user interface, preventing further transmission of the unauthorized communication, and restricting subsequent communications involving the device.

7. The SCADA system of claim 6, wherein the notification includes a request for the user interface to respond with response data indicating allowance or denial of the unauthorized communication.

8. The SCADA system of claim 7, wherein the response data indicates allowance of the unauthorized communication and the intrusion detection component is further configured to:
- transmit, in response to the allowance, a configuration request to a SCADA configuration component included within the SCADA system, the configuration request including information identifying the device and instructing the SCADA configuration component to configure the SCADA configuration information to include the new device information; and
- regenerate, from the SCADA configuration information including the new device information, the authorized communication information to include the unauthorized communication type within the one or more expected communication types.

9. The SCADA system of claim 7, wherein the response data indicates denial of the unauthorized communication and the intrusion detection component is further configured to execute, in response to the denial, at least one action to prevent further transmission of the unauthorized communication and restrict subsequent communications involving the device.

10. A computer-implemented method to manage an intrusion detection system (IDS) included within a supervisory control and data acquisition (SCADA) system in data communication with a plurality of industrial control devices via an industrial control system (ICS) network, the method comprising:
- reading, from a memory, SCADA configuration information including ICS network configuration information and device information descriptive of each industrial control device of the plurality of industrial control devices;
- generating, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices and including one or more valid write commands and state information associated with an industrial control device of the plurality of industrial control devices;
- monitoring the ICS network for communications;
- detecting at least one change in the SCADA configuration information;
- regenerating, responsive to the at least one change, the authorized communication information from the SCADA configuration information;
- identifying, with reference to the authorized communication information, an unauthorized communication transmitted via the industrial control network, the unauthorized communication having an unauthorized communication type different from any communication type of the one or more expected communication types, the unauthorized communication type being based on new device information descriptive of a device; and
- executing at least one action to address the at least one communication.

11. The method of claim 10, wherein identifying the unauthorized communication includes identifying an unauthorized communication having an unauthorized communication type based on at least one of a new port number, a new address, a new protocol, and a new state.

12. The method of claim 10, wherein executing the at least one action includes executing at least one of transmitting a notification to a user interface, preventing further transmission of the unauthorized communication, and restricting subsequent communications involving the device.

13. The method of claim 12, wherein transmitting the notification includes transmitting a notification including a request for the user interface to respond with response data indicating allowance or denial of the unauthorized communication.

14. The method of claim 13, wherein the response data indicates allowance of the unauthorized communication and the method further comprises:
- transmitting, in response to the allowance, a configuration request to a SCADA configuration component included within the SCADA system, the configuration request including information identifying the device and instructing the SCADA configuration component to configure the SCADA configuration information to include the new device information; and
- regenerating, from the SCADA configuration information including the new device information, the authorized communication information to include the unauthorized communication type within the one or more expected communication types.

15. The method of claim 13, wherein the response data indicates denial of the unauthorized communication and the method further comprises executing, in response to the denial, at least one action to prevent further transmission of the unauthorized communication and restrict subsequent communications involving the device.

16. A non-transitory computer readable medium having stored thereon sequences of instruction for managing an intrusion detection system (IDS) included within a supervisory control and data acquisition (SCADA) system in data communication with a plurality of industrial control devices via an industrial control system (ICS) network, the sequences of instruction including executable instructions that instruct at least one processor to:
- read, from a memory, SCADA configuration information including ICS network configuration information and device information descriptive of each industrial control device of the plurality of industrial control devices;
- generate, from the SCADA configuration information, authorized communication information descriptive of one or more expected communication types of communications authorized for transmission via the ICS network, each expected communication type of the one or more expected communication types being based on SCADA configuration information descriptive of an industrial control device of the plurality of industrial control devices and including one or more valid write commands and state information associated with-an industrial control device of the plurality of industrial control devices;
- monitor the ICS network for communications;
- detect at least one change in the SCADA configuration information;
- regenerate, responsive to the at least one change, the authorized communication information from the SCADA configuration information;

identify, with reference to the authorized communication information, an unauthorized communication transmitted via the ICS network, the unauthorized communication having an unauthorized communication type different from any communication type of the one or more expected communication types, the unauthorized communication type being based on new device information descriptive of a device; and execute at least one action to address the at least one communication.

17. The computer-readable medium of claim 16, wherein the new device information includes at least one of a new port number, a new address, a new protocol, and a new state.

\* \* \* \* \*